Aug. 4, 1970 R. E. HINKEL 3,523,278

SYSTEM FOR CONFIRMING THE VALIDITY OF REPETITIVELY SAMPLED DIGITAL DATA

Filed Feb. 5, 1968 2 Sheets-Sheet 1

INVENTOR

ROBERT E. HINKEL

BY

SOKOLSKI & WOHLGEMUTH

ATTORNEYS

Aug. 4, 1970 R. E. HINKEL 3,523,278
SYSTEM FOR CONFIRMING THE VALIDITY OF REPETITIVELY SAMPLED DIGITAL DATA
Filed Feb. 5, 1968 2 Sheets-Sheet 2

INVENTOR
ROBERT E. HINKEL
BY SOKOLSKI & WOHLGEMUTH
ATTORNEYS

United States Patent Office 3,523,278
Patented Aug. 4, 1970

3,523,278
SYSTEM FOR CONFIRMING THE VALIDITY OF REPETITIVELY SAMPLED DIGITAL DATA

Robert E. Hinkel, Los Angeles, Calif., assignor to Northrop Corporation, Beverly Hills, Calif., a corporation of California Filed Feb. 5, 1968, Ser. No. 703,168
Int. Cl. H04l 1/00
U.S. Cl. 340—146.1 6 Claims

ABSTRACT OF THE DISCLOSURE

A plurality of output lines having digital signals thereon to be confirmed as to their validity are fed to sequential sampling circuitry, wherein such signals are sequentially sampled in response to a clock generator. A lock-on circuit which is synchronized with the sequential sampling circuitry by the clock generator locks on to a predetermined one of the signals and gates this signal to a confirmation counting circuit as it successively appears in its sampling sequence. The confirmation counting circuit counts the successive appearances of the signal to be confirmed until a predetermined count for confirmation has been reached, at which time the confirmed output for this signal is provided and the lock-on circuit is released so that it may lock on to another signal to be confirmed.

Figure 1:
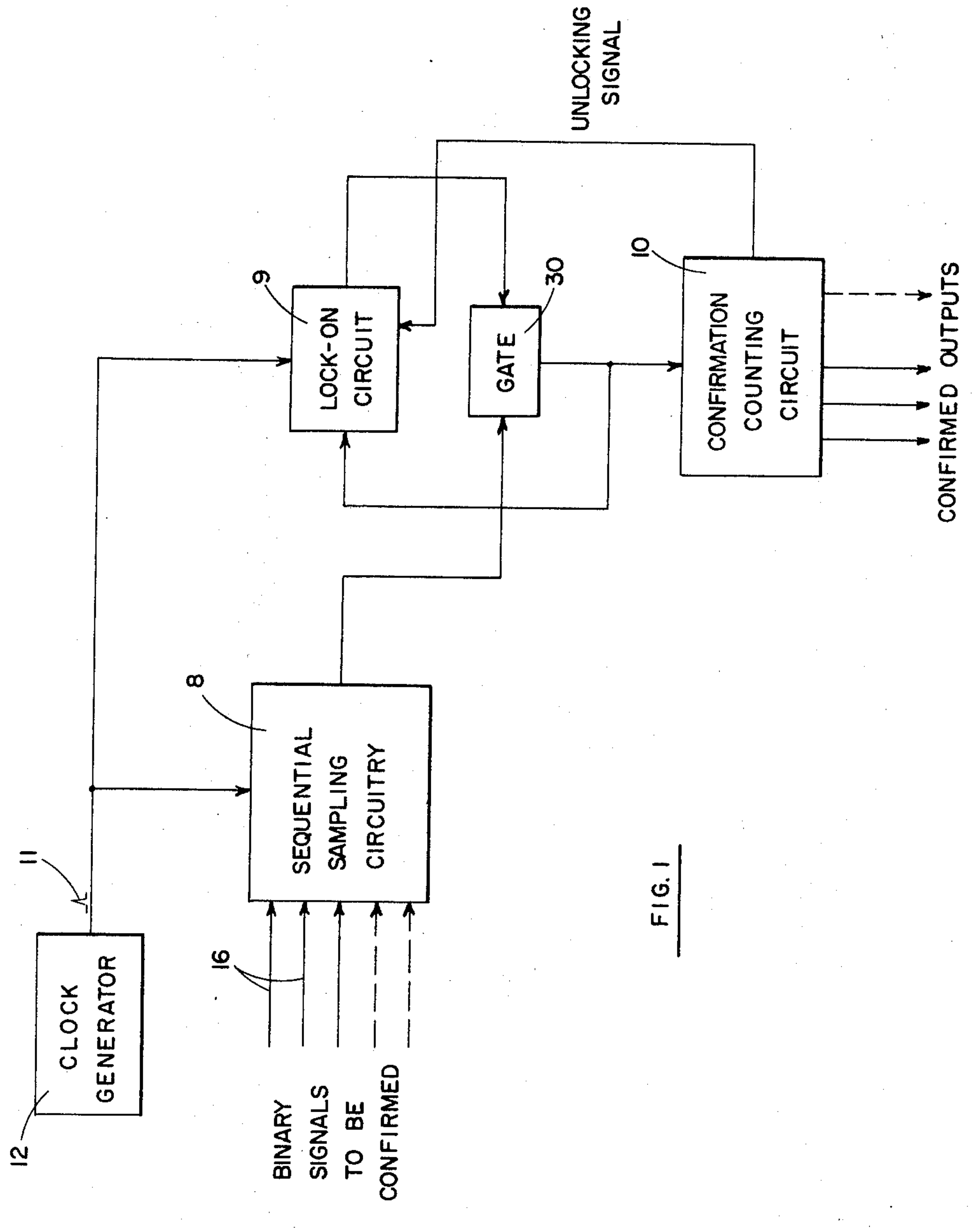

In data sampling of the type where binary signals indicative of the state of a series of monitored parameters are sequentially sampled, it has been found that noise pulses quite often trigger the logical control circuitry, thereby producing erroneous indications. This problem is particularly significant while operating the equipment in question in the field under noisy environmental conditions, such as, for example, in an aircraft where it would be in close proximity to engines generators and the like having high noise output.

Prior art techniques for eliminating noise signals of this type include the use of a filtering circuit on each line which might be affected. Due to the great member of separate input lines in the type of sampling equipment involved in data processing, and the bulkiness of the type of filters which would be needed to effectively achieve the desired filtering of low frequency interference noise signals, the use of such line filters is highly impractical, both from the point of expense and in view of the space requirements for the relatively large size capacitors needed for proper filtering action.

Voting sampling techniques have been used in the prior art to confirm the validity of binary signals. Such techniques of the prior art often involve the complete checking of each line separately, "holding" on the line being checked to ascertain the validity of the signal before providing a confirmed output. This is highly undesirable in a priority type system where certain outputs are given higher priorities over others because time may be wasted in confirming a signal which might be overridden by a higher priority signal further down the sampling line.

The system of this invention overcomes the shortcomings of the prior art in obviating the necessity for filter circuits on each line, and in lieu of this, providing sample compact digital confirmation circuitry. Further, in the system of the invention, confirmation is obtained without waiting at any individual data line, but rather continuing with the sampling operation and obtaining confirmation by successively checking the line to be confirmed in a normal sampling sequence.

Briefly, the system of this invention utilizes a first counter circuit which operates in conjunction with a plurality of gates to sequentially sample each of a plurality of input lines having binary data signals thereon. The presence of a TRUE input on any one of these lines is confirmed by locking on to a predetermined one of the lines the first time a TRUE signal appears thereon, such lock-on being accomplished by means of a second counter operating in conjunction with appropriate gating circuitry and synchronized with the first counter by means of a clock generator. Successive TRUE inputs on the signal line to be confirmed are counted by a third counter until they reach a predetermined confirmation count, at which time an output signal indicating such confirmation is produced and a control signal is provided to permit the second counter to lock on to another signal to be confirmed.

The system of this invention thus utilizes digital circuitry to efficiently confirm the validity of binary data signals.

The primary object of this invention is to provide a simple digital system for confirming the valadity of binary data signals, such confirmation being achieved as all of the binary data input lines to be verified are being sequentially sampled.

Figure 2:
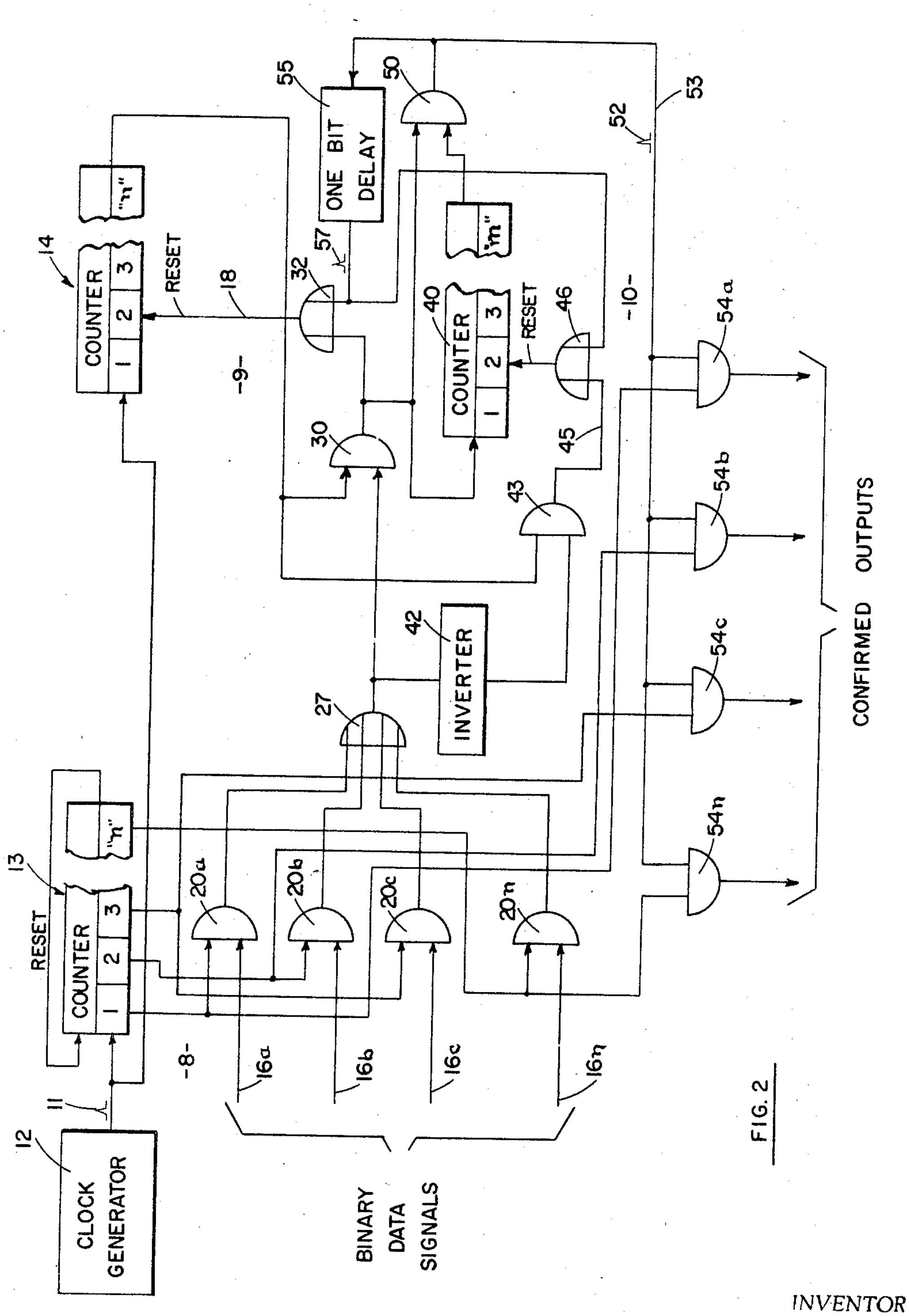

The invention will now be described in connection with the drawings, of which:

FIG. 1 is a block diagram illustrating the basic operation of the system of the invention, and FIG. 2 is a schematic drawing of a preferred embodiment of the system of the invention.

Referring now to FIG. 1, a block diagram illustrating the basic features of the invention is shown. Binary signals to be confirmed are fed to sequential sampling circuitry 8. Sequential sampling circuit 8 is synchronized with the repetitive pulse output 11 of clock generator 12, and has as its output a signal which represents the successive sampling of input lines 16 in repetitive sampling cycles. Thus, the output of sequential sampling circuitry 8 represents the successive monitoring of each of input lines 16 with an indication being provided against a time base of whether each of said lines has a TRUE or FALSE signal thereon. The output of sequential sampling circuitry 8 is fed to gate 30, this gate being controlled by lock-on circuit 9.

When the first TRUE signal appears on one of lines 16, the corresponding TRUE output from sequential sampling circuitry 8 which is fed to gate 30 causes this gate to pass a signal through to confirmation counting circuit 10, which counts this output. At the same time, gate 30 provides a signal to lock-on circuit 9 which causes this circuit to lock on to this particular signal to the exclusion of all the others, such lock-on operation being achieved by virtue of the control signal fed from the lock-on circuit to the gate. Lock-on circuit 9 operates in synchronization with sequential sampling circuitry 8 by virtue of a clock signal 11 fed thereto from clock generator 12.

Successive TRUE outputs from sequential sampling circuitry 8 from the particular signal line to which the lock-on circuit has locked on will produce successive counts in confirmation counting circuit 10 until the predetermined number of confirmation counts has been achieved, at which time a confirmed output signal for this line is generated and an unlocking signal is fed to lock-on circuit 9 to permit it to lock on to a succeeding TRUE output to be confirmed. In the event that a TRUE output is not present on the line being confirmed on any one of the successive monitoring cycles, lock-on circuit 9 will unlock from this line, halting the confirmation count of confirmation counting circuit 10 and resetting the circuits for the checking of the validity of the signal on a succeeding line.

Referring now to FIG. 2, clock pulses 11 are simultaneously fed from clock generator 12 to counters 13 and 14. Counters 13 and 14 may be conventional flipflop counter circuits, both having a count capability at least equal to "n," the number "n" corresponding to the number of binary data input lines 16a–16n. Counter 13 is a continuously recycling counter and has a reset signal fed from the output thereof whenever it reaches its "n" count (i.e., when count "n" is actuated), thus initiating a new count cycle. Counter 14, on the other hand, when it reaches its "n" count is connected so that it remains in such "n" count state even with new digital inputs thereto until it is reset to zero by the signal on reset line 18. Both counter 13 and counter 14 may be conventional binary flipflop counters in which each successive count is actuated in response to the arrival of succeeding clock signals 11 from clock generator 12.

The binary data signals to be confirmed, which are either "1" or "0" outputs corresponding to "TRUE" or "FALSE" conditions for the particular parameters being monitored, are each fed to a separate one of input lines 16a–16n. Input lines 16a–16n are each fed to a corresponding one of AND gates 20a–20n respectively. Also, fed to each of AND gates 20a–20n is an output count of counter 13 so that each of the counter output counts is associated with one of the binary data signals on one of lines 16a–16n respectively. It is to be noted at this point that the binary data signals appear on their associated lines 16a–16n simultaneously, i.e., they are continually present to represent the condition of the particular parameters being monitored. These signals, however, are sampled sequentially through their associated AND gates 20a–20n by virtue of the sequential actuation by each of the output stages of counter 13 in response to clock generator pulses 11. Thus, for example, AND gate 20a will only have an output when stage 1 of counter 13 is activated, which occurs only once during each complete cycle of the counter. The output, if any, from AND gate 20a will be followed by an output, if any, from AND gate 20b, and so on down the line until AND gate 20n has been sampled, whereupon the sampling action is sequentially repeated. The outputs of each of AND gates 20a–20n are fed to OR gate 27.

Counter 14 is driven by pulses 11 until it reaches its "n" count state, with count "n" being activated. Counter 14 remains at this "n" count until a reset signal arrives on line 18 through OR gate 32 from AND gate 30. AND gate 30 will only generate such a reset signal when an output is received from OR gate 27 in response to a TRUE output from one of AND gates 20a–20n. Thus, any time that counter 14 is at its "n" count, a signal is transmitted therefrom to AND gate 30 so that with the arrival of a TRUE input signal on one of lines 16a–16n, a reset signal will be provided from AND gate 30 to reset counter 14.

Counter 40 is a counter similar to counter 14, having an "m" count capability, the number "m" corresponding to the number of confirmation checks desired for confirming the binary input signals. The output of AND gate 30 is connected to the input of counter 40, so that each time this gate has a TRUE output, counter 40 will advance one step. The output of OR gate 27 is connected through inverter 42 to AND gate 43. AND gate 43 also receives an input from the "n" count of counter 14. The output of AND gate 43 provides a reset signal on line 45 to OR gate 46 and thence to counter 40. Thus, when counter 14 is at its "n" count and there is no output from OR gate 27, indicating the absence of any TRUE input thereto from one of AND gates 20a–20n, a reset signal will be provided for counter 40. The output of counter 40 indicating a particular signal has been confirmed is fed to AND gate 50 and thence on line 53 to each of AND gates 54a–54n.

Let us now see how the binary data signal inputs are confirmed: Let us assume, for example, that there is a TRUE output signal on line 16b. Let us assume, also, that counter 14 has reached its "n" count condition and is holding in such condition. Let us also assume that this is the only input line on which there is a TRUE input. Under such conditions, when counter 13 reaches its "2" count, AND gate 20b will generate a TRUE output, providing this output through OR gate 27 as an input to AND gate 30. AND gate 30 at this moment having an input from counter 14 as well as OR gate 27 will provide an input signal to counter 40, causing this counter to be advanced one step. At the same time, counter 14 is reset by the signal on line 18 from OR gate 32. Counter 14 thus will start a new count in response to pulses 11. It is to be noted at this point that counter 14, while synchronized with counter 13 by virtue of the common clock pulse actuation thereof, is out of step with this counter by two steps. Thus, when counter 13 again reaches its "2" count state, counter 14 again reaches its "n" count condition. Let us assume that on this second count cycle, the TRUE signal is still on line 16b. Such being the case, everything will be set up to provide a second actuation for counter 40 to advance it to its second count. Also, as before, counter 14 will be reset to repeat the operation. Assuming that the TRUE signal remains on line 16b for "m" number of counting cycles, counter 40 will be successively advanced until it finally reaches its "m" count and will remain in this "m" count condition in the absence of a reset signal on line 45. The "m" count output of counter 40 is fed to AND gate 50. Also fed to this AND gate is the output of AND gate 30. Thus, with the next arrival of a TRUE input from OR gate 27 to AND gate 30, AND gate 50 will produce a confirmation signal 52 on line 53. Confirmation signals from line 53 are fed in parallel to AND gates 54a–54n, there being one of such gates for each of the binary data signal inputs. Each of these AND gates is synchronized with an associated one of the outputs of counter 13 corresponding to the related data signal input. Thus, in this particular instance, for the TRUE input signal on line 16b a confirmed output signal will be produced by AND gate 54b at the appropriate sampling time.

Let us now assume that the signal on line 16b has disappeared, indicating either that the fault disappeared or that the signal was an extraneous noise signal. If this should occur, at any time during the operation, the reset signal for counter 14 is not provided and this counter rests in its saturated condition. At the same time, the absence of a TRUE output from OR gate 27 in conjunction with the saturated output from counter 14 drives AND gate 43 to its TRUE state to reset counter 40, thereby erasing the confirmation count.

Let us assume that there also is a TRUE input on line 16c at the same time that a TRUE input was present on line 16b. This second signal could have no effect on the operation of the system because of the fact that when it arrived counter 14 would not be in its "n" count condition and therefore no counting signal could be provided to counter 40 through AND gate 30. This line could, however, be confirmed once the confirmation of the first received signal, i.e., that on line 16b, was completed.

Such "unlocking" from the first line to permit the confirmation of a second signal is achieved in the following manner: The confirmation signal 52 appearing on line 53 is fed to one bit delay 55 which may comprise a delay flip-flop. The delayed output signal 57 from one bit delay 55 is fed through OR gate 32 to reset counter 14 and through OR gate 46 to reset counter 40. The reset of counter 14 operates to unlock this counter by offsetting its count so that it will now reach the end of its count when counter 13 is in its third count, and the next succeeding line, 16c is being sampled. In this manner, successive input lines are confirmed in the order that TRUE signals appear thereon. It should be quite obvious that the confirmation of particular lines can be overridden in favor of other lines by, for example, providing appropriate reset control signals at the proper times for counters 14 and 40 from appropriate control circuitry (not shown).

The system of this invention thus provides a simple yet highly effective means for confirming the validity of binary signals.

While the system of the invention has been described and illustrated in detail, it is to be clearly understood that this is intended by way of illustration and example only and is not to be taken by way of limitation, the spirit and scope of this invention being limited only by the terms of the following claims.

I claim:

1. A system for confirming the validity of a plurality of binary data signals, each of said signals being on a separate input line, comprising:

a separate gate for receiving each of said signals, sampling counter means for activating each of said gates in succession, lock-on circuit means for locking on to a predetermined one of said signals, said lock-on circuit means including lock-on counter means synchronized with said sampling counter means but offset therefrom by a predetermined count corresponding to the signal input line being confirmed, gating means connected to receive the outputs of said gates and controlled by said lock-on counter means to provide a TRUE output only in response to said predetermined one of said signals, and confirmation counter means for counting successive TRUE outputs from said gating means, said confirmation counter means adapted to produce a confirmation output signal when a predetermined number of successive TRUE outputs are received thereby from said gating means.

2. The system as recited in claim 1 and including clock generator means for providing a pulse output for synchronizing said lock-on counter means with said sampling counter means.

3. The system as recited in claim 1 and further including a one bit delay, said confirmation output signal being fed through said one bit delay to provide a reset for said lock-on circuit means to cause said circuit means to unlock from said predetermined one of said signals.

4. The system as recited in claim 1, the TRUE outputs of said gating means being additionally fed to said sampling counter means as reset signals therefor.

5. A system for confirming the validity of a plurality of digital signals comprising:

sampling circuit means for sampling each of said signals and sequentially generating a digital output in accordance with each signal sampled, lock-on circuit means for locking on to a predetermined one of said signals to be confirmed, clock generator means for digitally synchronizing the operation of said aforementioned circuit means with each other, confirmation counting circuit means for counting each digital output of said sampling circuit means corresponding to said predetermined one of said signals to be confirmed until a predetermined confirmation count has been reached, and gating means for gating the digital outputs corresponding to said one of said signals to be confirmed between said sampling circuit means and said confirmation circuit means, said gating means operating in response to said lock-on circuit means, the output of said gating means further being fed to said lock-on circuit means to hold lock-on with said predetermined one of said signals, said confirmation counting circuit means generating a confirmed output signal when said predetermined confirmation count has been reached, and providing a signal to unlock said lock-on circuit means from said predetermined one of said signals to permit lock-on to a succeeding one of said signals.

6. The system as recited in claim 5 and further including a one bit delay, said signal to unlock said lock-on circuit means being fed through said one bit delay as a reset signal for said lock-on circuit means.

References Cited

UNITED STATES PATENTS 3,288,928 11/1966 Bartlett et al. -------- 178—50

MALCOLM A. MORRISON, Primary Examiner

R. STEPHEN DILDINE, Jr., Assistant Examiner

U.S. Cl. X.R.

178—50; 325—42; 328—137; 340—415